(12) United States Patent
Hendrickson et al.

(10) Patent No.: US 9,018,878 B2
(45) Date of Patent: Apr. 28, 2015

(54) DERATING VEHICLE ELECTRIC DRIVE MOTOR AND GENERATOR COMPONENTS

(75) Inventors: Matthew Hendrickson, Dunlap, IL (US); Bo Xie, Peoria, IL (US)

(73) Assignee: Caterpillar Inc., Peoria, IL (US)

( * ) Notice: Subject to any disclaimer, the term of this patent is extended or adjusted under 35 U.S.C. 154(b) by 255 days.

(21) Appl. No.: 13/555,563

(22) Filed: Jul. 23, 2012

(65) Prior Publication Data

US 2014/0021898 A1    Jan. 23, 2014

(51) Int. Cl.
*H02P 1/04* (2006.01)
*H02P 27/04* (2006.01)
*H02P 29/00* (2006.01)
*H02P 29/02* (2006.01)

(52) U.S. Cl.
CPC ............ *H02P 27/04* (2013.01); *H02P 29/0044* (2013.01); *H02P 29/028* (2013.01)

(58) Field of Classification Search
CPC ..... H02H 7/093; H02H 7/0852; H02H 6/005; H02P 23/0063
USPC ................................ 318/461, 471, 432, 139
See application file for complete search history.

(56) References Cited

U.S. PATENT DOCUMENTS

| | | | |
|---|---|---|---|
| 4,626,753 A | 12/1986 | Letterman | |
| 5,123,081 A | 6/1992 | Bachman et al. | |
| 5,305,234 A | 4/1994 | Markus et al. | |
| 5,341,077 A | 8/1994 | Chen et al. | |
| 5,446,362 A | 8/1995 | Vanek et al. | |
| 5,712,802 A | 1/1998 | Kumar et al. | |
| 5,721,479 A | 2/1998 | Kumar et al. | |
| 6,465,978 B2 | 10/2002 | Takahashi | |
| 6,847,187 B2 | 1/2005 | Kumar | |
| 6,927,549 B2 | 8/2005 | Ashiya et al. | |
| 7,045,981 B2 | 5/2006 | Nicolussi et al. | |
| 7,099,793 B2 | 8/2006 | Rechberger | |
| 7,353,094 B2 * | 4/2008 | Okoshi et al. | ............. 701/22 |
| 7,414,377 B2 | 8/2008 | Mayhew et al. | |
| 7,443,122 B2 | 10/2008 | Tate et al. | |
| 7,570,074 B2 | 8/2009 | Gao et al. | |
| 7,615,951 B2 * | 11/2009 | Son et al. | ............ 318/432 |
| 7,640,621 B2 | 1/2010 | Cloud, III | |
| 7,769,552 B2 | 8/2010 | Colby et al. | |
| 7,839,108 B2 | 11/2010 | Patel et al. | |
| 2002/0180401 A1 | 12/2002 | Kumar | |
| 2003/0064858 A1 * | 4/2003 | Saeki et al. | ............ 477/166 |
| 2003/0111976 A1 | 6/2003 | Kumar | |

(Continued)

FOREIGN PATENT DOCUMENTS

JP   2007282478   10/2007

*Primary Examiner* — Rina Duda
(74) *Attorney, Agent, or Firm* — Leydig, Voit & Mayer, Ltd.

(57) ABSTRACT

A machine propelled by an electric motor and subject to a deration scheme is described wherein deration is specified by a combination of a temperature signal indicating a degree to which a machine component is overheating. The machine includes an electronic controller that receives a temperature signal indicative of a current temperature status of the electric motor. The electronic controller receives a motor speed signal indicative of a current speed status of the electric motor. The electronic controller calculates, in accordance with a derating scheme, a deration value for the electric motor, the deration value being determined by applying a set of current operating state parameter values to the derating scheme. The set of current operating state parameters include: a motor speed parameter value; and a temperature parameter value.

20 Claims, 8 Drawing Sheets

(56) References Cited

U.S. PATENT DOCUMENTS

| | | |
|---|---|---|
| 2004/0201359 A1 | 10/2004 | Kumar |
| 2007/0216327 A1* | 9/2007 | Sugita ........................ 318/269 |
| 2008/0054835 A1 | 3/2008 | Tamaru |
| 2008/0203690 A1 | 8/2008 | Horiuchi et al. |
| 2009/0066284 A1 | 3/2009 | Lee |
| 2009/0132116 A1 | 5/2009 | Tanaka et al. |
| 2009/0293760 A1 | 12/2009 | Kumar et al. |
| 2010/0117580 A1 | 5/2010 | Miwa et al. |
| 2010/0117581 A1 | 5/2010 | Miwa et al. |
| 2010/0141186 A1 | 6/2010 | Katzenberger et al. |
| 2010/0222953 A1* | 9/2010 | Tang ............................. 701/22 |
| 2011/0213518 A1 | 9/2011 | Welchko et al. |
| 2011/0279074 A1 | 11/2011 | Yeh et al. |

\* cited by examiner

US 9,018,878 B2

DERATING VEHICLE ELECTRIC DRIVE MOTOR AND GENERATOR COMPONENTS

TECHNICAL FIELD

This patent disclosure relates generally to vehicles including electric drive motor systems powered by on-board generator components and, more particularly to controls for such systems to protect against thermal damage during operation of such vehicles.

BACKGROUND

Heavy machinery, such as off-highway trucking equipment, is commonly used in mining, heavy construction, quarrying, and other applications. Due to the substantial capital investment involved, tight tolerances with respect to the time allotted for completing tasks, and the expense of maintaining and operating heavy machinery, such as a mining truck, an entity can suffer significant monetary losses when the heavy machinery malfunctions. The complexity of modern heavy machinery often exacerbates this problem due to the need for skilled personnel to perform various tests on such machinery to trouble shoot such malfunctions. Even so, significant time is often spent locating the fault and then performing an appropriate repair.

One advance that has improved efficiency associated with the use of heavy machinery is the adoption of Alternating Current (AC) or electric drive systems. Electric drive systems typically require less maintenance and thus, have lower life cycle costs. When the heavy machinery malfunctions, however, the costs associated with the downtime are often substantial.

Direct series electric drive systems for machines typically include a power circuit that selectively activates one or more drive motors at a desired torque. Each of the drive motors is connected to a wheel or other traction device that operates to propel the machine. A direct series drive system also includes a prime mover, for example, an internal combustion engine, that drives a power generator. The power generator produces electrical power conditioned by a power circuit, and ultimately used to drive the motor. Conceptually, mechanical power produced by the internal combustion engine is converted into electrical power by the generator. The electrical power is processed and/or conditioned by the power circuit before it is metered to the motors. The motors transform the electrical power back into mechanical power that drives the wheels and propel the machine.

The electrical components are susceptible to overheating under high load conditions. In such situations, known systems detect the excessive heat, and a warning light informs the operator. What typically follows is the operator shutting down the machinery to prevent permanent damage to the generator providing electricity to the drive motors and/or the motors driving the machinery.

Another heat management approach incorporated into electrical drive systems, described in Vanek et al., U.S. Pat. No. 5,446,362 involves derating electrical motor operation when a temperature exceeds a threshold value specified by a protection system. Derating of the electrical motor is accomplished by reducing a torque limit. The lowering of the torque limit is carried out by reducing the input to the electrical motor from a power inverter that energizes the windings of the electrical motor.

SUMMARY OF THE INVENTION

In view of the general need to provide reliable operation of electric generators under high power and/or loss condition, a machine propelled by an electric motor is described. The machine includes a drive wheel connected to a rotating interface of the electric motor for operating at least in a propel mode wherein the electric motor delivers rotational force to the drive wheel. The machine also includes an electronic controller configured with computer executable instructions for performing a set of steps. The electronic controller is configured to receive a temperature signal indicative of a current temperature status of the electric motor. The temperature signal may correspond to an actual temperature, or alternatively a thermo model-based value. The electronic controller is further configured to receive a motor speed signal indicative of a current speed status of the electric motor. The electronic controller is further configured to calculate, in accordance with a derating scheme, a deration value for the electric motor, the deration value being determined by applying a set of current operating state parameter values to the derating scheme. The set of current operating state parameters include: a motor speed parameter value; and a temperature parameter value. Thus, the electronic controller's determination of a deration state is not based solely upon a temperature signal, and instead takes into consideration operational state of, for example, a motor subject to the deration specified by the electronic controller.

BRIEF DESCRIPTION OF THE DRAWINGS

While the appended claims set forth the features of the present invention with particularity, the invention and its advantages are best understood from the following detailed description taken in conjunction with the accompanying drawings, of which:

DETAILED DESCRIPTION

This disclosure relates to systems and methods for determining operating conditions of generator and motor components in a direct series electric drives, and invoking operations to derate either the generator or motor components in response to detection of conditions indicating that the system is being, or will be, damaged. The disclosure uses an example of a direct series electric drive system having an engine connected to a generator for producing electrical power that drives the vehicle. In the illustrative examples, the generator associated with the machine is a multi-phase alternating current (AC) synchronous brushless generator having a rotating input coupled with the output of the engine. The generator includes a rotating rectifier assembly including three rotating diode pairs, and using a wye (Y) configuration for the windings. The systems and methods disclosed herein, however, also have applicability to other electric drive vehicles. For example, the generator associated with the machine or vehicle could use a delta ($\Delta$) configuration for the windings.

Figure 1A:
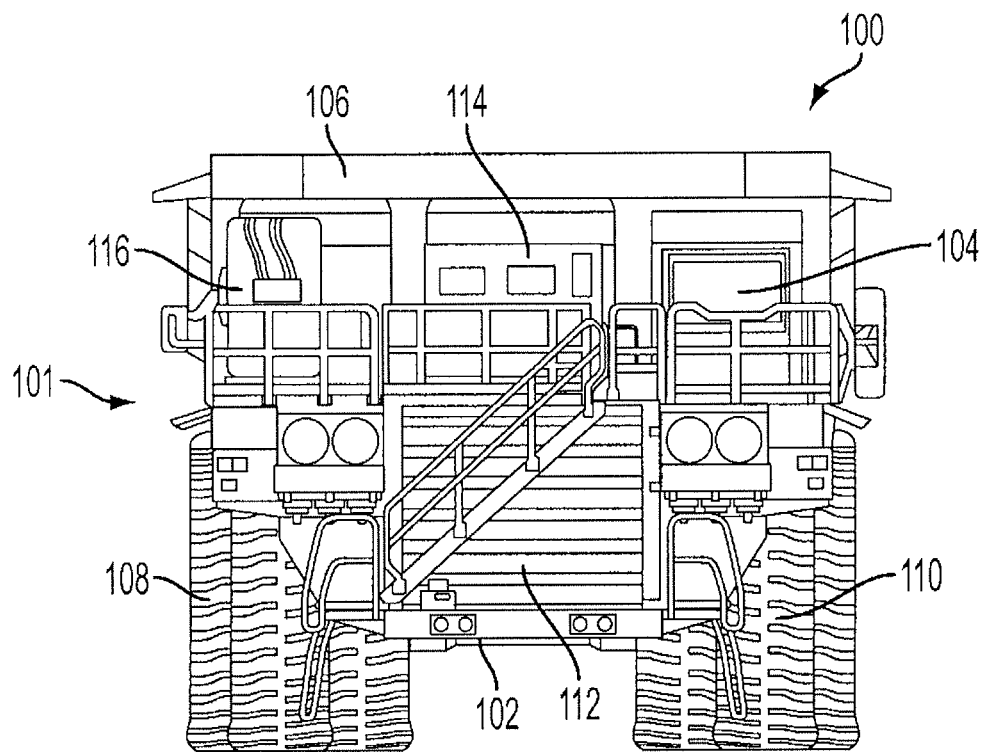
FIGS. 1A and 1B are, respectively, a front view and a side view of a machine in accordance with the disclosure.
Figure 1B:
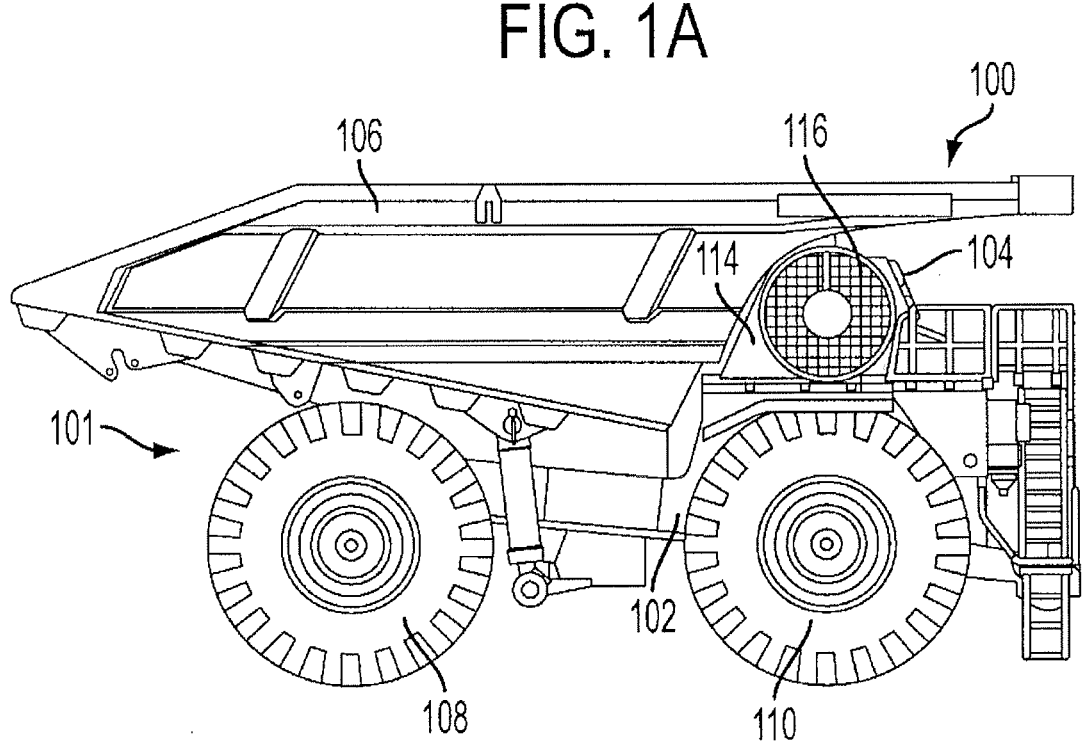

FIG. 1A and FIG. 1B illustrate, respectively, a front and a side view of a machine 100. The machine 100 is a direct series electric drive machine. One example of the machine 100 is an off-highway truck 101 such as those used for construction, mining, or quarrying. In the description that follows, this example illustrates the various arrangements that can be used on machines having direct series electric drive systems. As can be appreciated, any other vehicle having a direct series electric drive or electric-only arrangement can benefit from the advantages described herein. The term "machine," therefore, is used to generically describe any machine having at least one drive wheel that is driven by a motor connected to the wheel. Electrical power may be generated onboard by a generator, alternator, or another power-generation device, which may be driven by an engine or other prime mover. Alternatively, electrical power may be stored but not generated on-board.

A front view of the off-highway truck 101 is shown in FIG. 1A, and a side view is shown in FIG. 1B. The off-highway truck 101 includes a chassis 102 that supports an operator cab 104 and a bucket 106. The bucket 106 is pivotally connected to the chassis 102 and is arranged to carry a payload when the off-highway truck 101 is in service. An operator occupying the operator cab 104 can control the motion and the various functions of the off-highway truck 101. The chassis 102 supports various drive system components, including an engine blocked from view by a grill 112. These drive system components are capable of driving a set of drive wheels 108 to propel the off-highway truck 101. A set of idle wheels 110 can steer such that the off-highway truck 101 can move in any direction. Even though the off-highway truck 101 includes a rigid chassis with powered wheels for motion and steerable wheels for steering, one can appreciate that other machine configurations can be used. For example, such configurations may include articulated chassis with one or more driven wheels.

Figure 2:
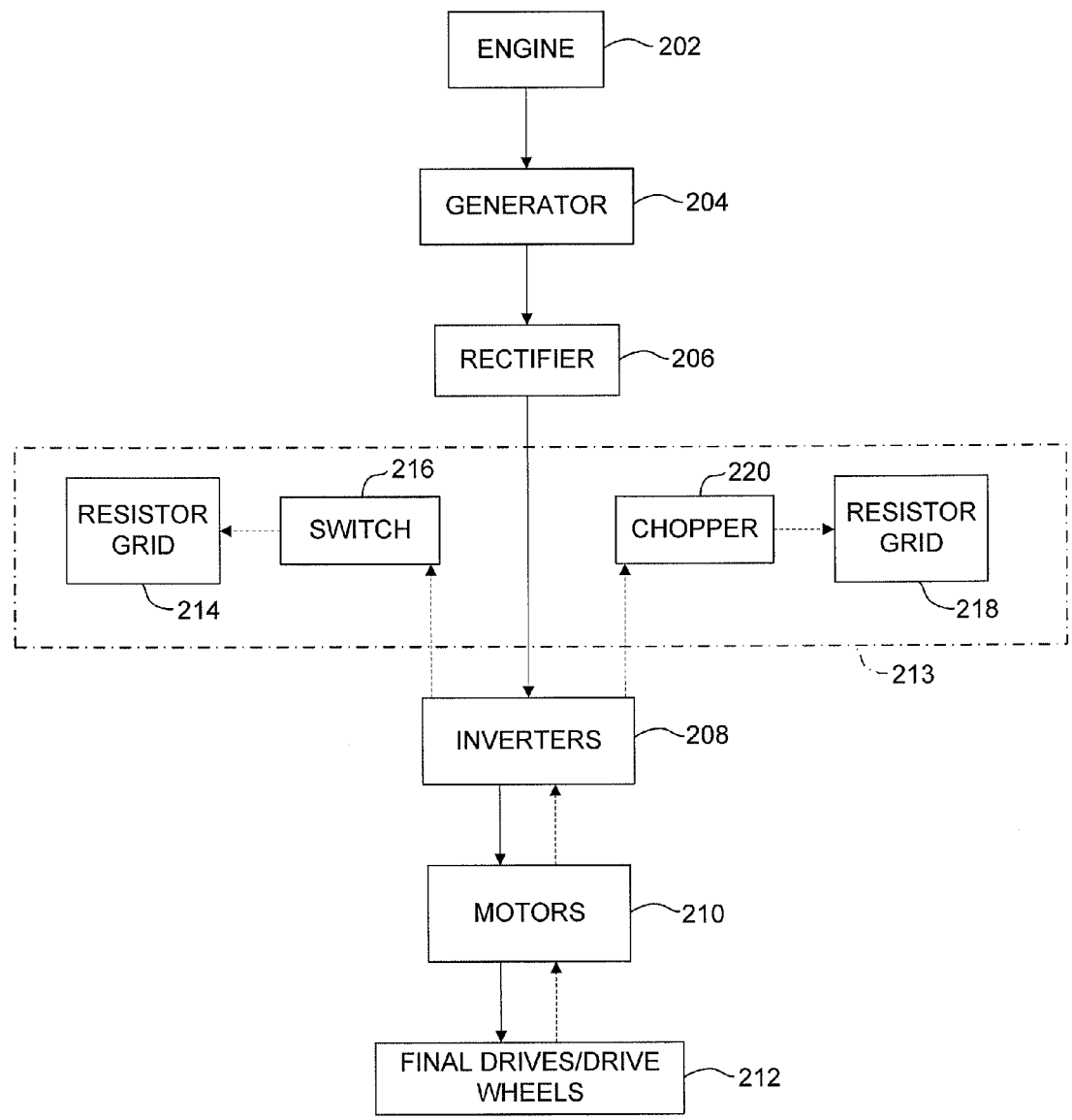
FIG. 2 is a block diagram of a direct series electric drive system for a machine in accordance with the disclosure.

The off-highway truck 101 is a direct series electric drive machine, which in this instance refers to the use of more than one source or form of power to drive the drive wheels 108. A block diagram for the direct series electric drive system of the machine 100, for example, the off-highway truck 101, is shown in FIG. 2. In the block diagram, the flow direction of power in the system when the machine is propelled is denoted by solid-lined arrows. Conversely, the flow of power during a retarding mode is shown in dash-lined arrows. The direct series electric drive system includes an engine 202, for example, an internal combustion engine such as a diesel engine, which produces an output torque at an output shaft (not shown). The output shaft of the engine 202 is connected to a generator 204. In operation, the output shaft of the engine 202 rotates a rotor of the generator 204 to produce electrical power, for example, in the form of alternating current (AC) power. This electrical power is supplied to a rectifier 206 and converted to direct current (DC) power. The rectified DC power may be converted again to AC power by an inverter circuit 208. The inverter circuit 208 may be capable of selectively adjusting the frequency and/or pulse-width of its output, such that motors 210 that are connected to an output of the inverter circuit 208 may be operated at variable speeds. The motors 210 may be connected via final assemblies (not shown) or directly to drive wheels 212 of the machine 100.

When the off-highway truck 101 is propelled, the engine 202 generates mechanical power that is transformed into electrical power, which is conditioned by various electrical components. In an illustrated embodiment, such components are housed within a cabinet 114 (FIG. 1A). The cabinet 114 is disposed on a platform that is adjacent to the operator cab 104 and may include the rectifier 206 (FIG. 2), inverter circuit 208 (FIG. 2), and/or other components. When the off-highway truck 101 is to be decelerated or its motion is otherwise to be retarded, for example, to prevent acceleration of the machine when travelling down an incline, its kinetic energy is converted to electrical energy. Effective disposition of this generated electrical power enables effective retarding of the off-highway truck 101.

Specifically, when the machine 100 is retarding, the kinetic energy of the machine 100 is transferred into rotational power of the drive wheels that rotates the motors 210, which act as electrical generators. The electrical power generated by the motors 210 has an AC waveform. Because the inverter circuit 208 is a bridge inverter, power supplied by the motors 210 is rectified by the inverter circuit 208 into DC power. Dissipation of the DC power generated by the motors 210 produces a counter-rotational torque at the drive wheels 108 to decelerate the machine. Dissipation of this DC power may be accomplished by passing the generated current rectified by the inverter circuit 208 through a resistance. To accomplish this, a retarder arrangement 213 may include a first resistor grid 214, described in greater detail below, that is arranged to receive current from the inverter circuit 208 via a switch 216. When the switch 216 is closed, the electrical power corresponding to the current generated by the motors 210 may pass through the first resistor grid 214 and dissipate as heat. Additionally, excess electrical power is also dissipated as heat as it passes through a second resistor grid 218, which is arranged to receive electrical power via a chopper circuit 220. The chopper circuit 220 operates to selectively route a portion of the developed electrical power through the second resistor grid 218. One embodiment for the drive and retarding system is described in more detail below.

Figure 3:
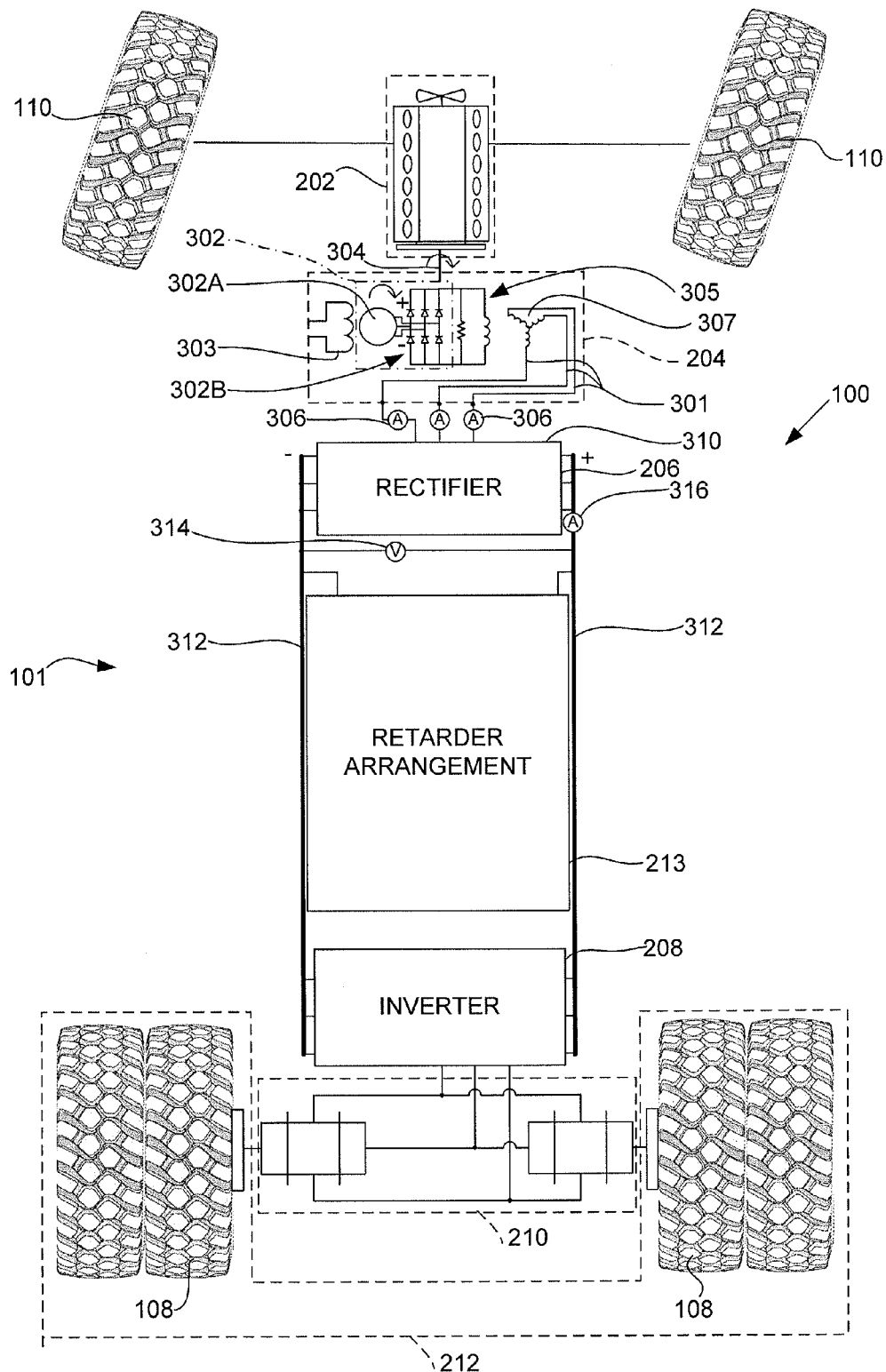
FIG. 3 is an electrical schematic block diagram representation of a direct series electric drive and retard system in accordance with the disclosure.
Figure 4:
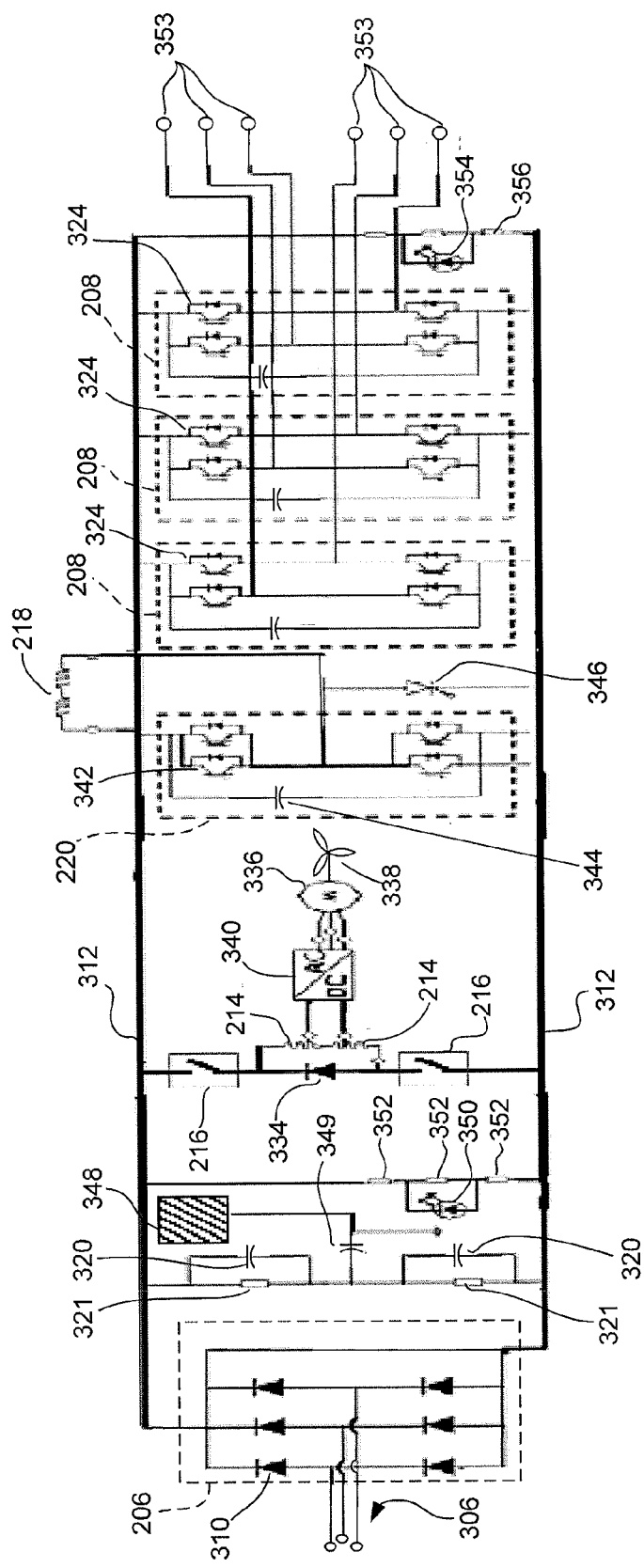
FIG. 4 is an additional, simplified, electrical schematic block diagram representation of the drive and retarding system shown in FIG. 3.

A block diagram of the direct series electric diesel electric drive system of the off-highway truck 101, as one example for the machine 100, is shown in FIG. 3 and FIG. 4. In these views, elements that were previously described are denoted by the same reference numerals for the sake of simplicity. Further, the block diagram of FIG. 4 includes a particular embodiment with component examples that can be included in the functional blocks shown in FIG. 3. Hence, the block diagrams shown in FIG. 3 and FIG. 4 should be referred to together when considering the description that follows. As shown, the engine 202 is connected to the generator 204 (shown in FIG. 3) via an output drive shaft 304. Even though a direct connection to the output drive shaft 304 is shown, other drive components, such as a transmission or other gear arrangements, may be utilized to couple the output of the engine 202 to the generator 204. The generator 204 may be any appropriate type of generator or alternator known in the power generation art.

In one embodiment, the generator 204 is a three-phase alternating current (AC) synchronous generator having a brushless, wound rotor. The generator 204 has an output 301 for each of three phases of alternating current being generated, with each output having a respective current transducer 306 (identified in both FIG. 3 and FIG. 4) connected thereto. The rotor of the generator 204 (shown only in FIG. 3) includes a rotating rectifier 302 that is connected to a rotating exciter armature 302A. The rotating exciter armature 302A is energized by an excitation field produced by an excitation winding 303. Thus, the application of an excitation signal at the input to the excitation winding 303 creates an excitation field to activate the generator field 305. The generator field 305, in turn, produces the output available at three leads of the armature 307 of the generator 204.

In the illustrated embodiment, the rotating rectifier 302 includes a rotating exciter armature 302A that is connected to a series of rotating diodes 302B. The three current outputs of the generator 204, which are collectively considered the output of the generator 204, are connected to a rectifier 206. Other generator arrangements may alternatively be used.

The rectifier 206 converts the AC power supplied by the generator 204 into DC power. Any type of rectifier 206 may be used. The rectifier 206 converts the AC power supplied by the generator 204 into DC power. Any type of rectifier may be used. In the example shown, the rectifier 206 is a poly-phase diode bridge, and in particular is a three phase full bridge rectifier. The rectifier 206 includes three parallel pairs of power diodes 310, each pair being associated with a given phase of the output of the generator 204. Each such diode pair includes two power diodes 310 connected in series across the DC link 312, with the selected output of the generator 204 providing a power input between each pair.

When power is supplied from the three phase output of the generator 204, the rectifier 206 operates to provide full wave rectification of each of the phases of the three-phase alternating current. The rectifier 206 develops a voltage across a DC linkage or DC link 312. This DC link voltage is available at a first rail and a second rail of the DC link 312. The first rail is typically at a first voltage and the second rail is typically at a second voltage during operation. Either of the first and second voltages may be zero.

During operation, a voltage is developed across the first and second rails of the DC link 312 by the rectifier 206 and/or an inverter circuit 208. One or more capacitors 320 may be connected in parallel with one or more resistors 321 across the DC link 312 to smooth the voltage V across the first and second rails of the DC link 312. The DC link 312 exhibits a DC link voltage, V, which can be measured by a voltage transducer 314, and a current, A, which can be measured by a current transducer 316, as shown in FIG. 3.

The inverter circuit 208 is connected in parallel with the rectifier 206 and operates to transform the DC voltage V into variable frequency sinusoidal or non-sinusoidal AC power that drives, in this example, the motors 210 (FIG. 3). Any known inverter may be used for the arrangement of the inverter circuit 208. In the example shown in FIG. 4, the inverter circuit 208 includes three phase arrays of insulated-gate bipolar transistors (IGBT) 324 that are arranged in transistor pairs and that are configured to supply a 3-phase AC output to each of the motors 210.

The inverter circuit 208 can control the speed of the motors 210 by controlling the frequency and/or the pulse-width of the AC output. The motors 210 may be directly connected to the drive wheels 108 or may power final drives that power the drive wheels 212. Final drives, as is known, operate to reduce the rate of rotation and increase the torque between the motors 210 and each set of drive wheels 212.

In alternative embodiments, the engine 202 and generator 204 are not required to supply the power necessary to drive the motors 210. Instead, such alternative embodiments use another source of power, such as a battery or contact with an electrified rail or cable. In some embodiments, one drive motor may be used to power all drive wheels of the machine, while in other embodiments, any number of drive motors may be used to power any number of drive wheels, including all wheels connected to the machine.

Returning now to the block diagrams of FIG. 3 and FIG. 4, when the machine 100 operates in an electric braking mode, which is also known as electric retarding, less power is supplied from the generator 204 to the DC link 312. Because the machine is travelling at some non-zero speed, rotation of the drive wheels 108 due to the kinetic energy of the machine 100 will power the motors 210. The motors 210, in this mode, act as generators by producing AC electrical power. Consumption or disposition of this electrical power will consume work and act to apply a counter-rotational torque on the drive wheels 108, causing them to reduce their rotational speed, thus retarding the machine.

The generated AC electrical power can be converted into DC electrical power through the inverter circuit 208 for eventual consumption or disposition, for example, in the form of heat. In an illustrated embodiment, the retarder arrangement 213 consumes such electrical power generated during retarding. The retarder arrangement 213 can include any suitable arrangement that will operate to dissipate electrical power during retarding of the machine. In the exemplary embodiments shown in FIG. 4, the retarder arrangement 213 includes a first resistor grid 214 that is arranged to dissipate electrical energy at a fixed rate. The retarder arrangement 213 also includes a second resistor grid 218, to which DC current is supplied at a selectively variable rate by use of a pulse width modulator (PWM) or chopper circuit 220. In this way, the second resistor grid 218 dissipates electrical energy at a variable rate.

When the machine 100 is to operate in a retarding mode, the first resistor grid 214 is connected between the first and second rails of the DC link 312 so that current may be passed there through. When the machine 100 is being propelled, however, the first resistor grid 214 is electrically isolated from the DC link 312 by two contactors or bipolar automatic switches (BAS) 216. Each BAS 216 may include a pair of electrical contacts that are closed by an actuating mechanism, for example, a solenoid (not shown) or a coil creating a magnetic force that attracts the electric contacts to a closed position. The BAS 216 may include appropriate electrical shielding and anti-spark features that can allow these items to operate repeatedly in a high voltage environment.

When the machine 100 initiates retarding, it is desirable to close both BAS 216 within a relatively short period such that the first resistor grid 214 is placed in circuit between the first and second DC rails to begin energy dissipation rapidly. Simultaneous actuation or actuation at about the same time, such as, within a few milliseconds, of the pair of BAS 216 may also advantageously avoid charging the first resistor grid 214 and other circuit elements to the voltage present at the rails of the DC link 312. The pair of BAS 216 also prevents exposure of each of the BAS 216 or other components in the system to a large voltage difference (the voltage difference across the DC link 312) for a prolonged period. A diode 334 may be disposed in parallel to the first resistor grid 214 to reduce arcing across the BAS 216, and also electrically isolate the first resistor grid 214 from the DC link 312 during a propel mode of operation.

When the machine 100 is retarding, a large amount of heat can be produced by the first resistor grid 214. Such energy, when converted to heat, must be removed from the first resistor grid 214 to avoid an overheating condition. For this reason, a blower 338, driven by a motor 336, operates to convectively cool the first resistor grid 214. There are a number of different alternatives available for generating the power to drive the motor 336. In this embodiment, a DC/AC inverter 340 is arranged to draw power from voltage-regulated locations across a portion of the first resistor grid 214. The DC/AC inverter 340 may advantageously convert DC power from the DC link 312 to 3-phase AC power that drives the motor 336 when voltage is applied to the first resistor grid 214 during retarding.

In the illustrated embodiment, the BAS 216 are not arranged to modulate the amount of energy that is dissipated through the first resistor grid 214. During retarding, however, the machine 100 may have different energy dissipation requirements. This is because, among other things, the voltage V in the DC link 312 should be controlled to be within a predetermined range. To meet such dissipation requirements, the second resistor grid 218 can be exposed to a controlled current during retarding through action of the chopper circuit 220. The chopper circuit 220 may have any appropriate configuration that will allow modulation of the current supplied to the second resistor grid 218. In this embodiment, the chopper circuit 220 includes an arrangement of transistors 342 that can, when actuated according to a desired frequency and/or duration, modulate the current passed to the second resistor grid 218. This controls the amount of energy dissipated by the second resistor grid 218 during retarding. The chopper circuit 220 may additionally include a capacitor 344 that is disposed between the first and second rails of the DC link 312 and that regulates the voltage input to the chopper circuit 220. A switched diode 346 may be connected between the second resistor grid 218 and the DC link 312 to protect against short circuit conditions in the DC link 312 and to provide a device that can deactivate the DC link 312, for example, during service.

The passage of current through the second resistor grid 218 will also generate heat, necessitating cooling of the second resistor grid 218. In this embodiment, the first and second resistor grids 214 and 218 may both be located within the blower housing 116 (also shown in FIG. 1A and FIG. 2) for convective cooling when the motor 336 and blower 338 are active.

The embodiment for a drive system shown in FIG. 4 includes other components that are discussed for the sake of completeness. Such components are optional but are shown herein because they promote smooth and efficient operation of the drive system. In this exemplary embodiment, a leakage detector 348 is connected between the two resistors 321, in parallel with a capacitor 349, to the first and second rails of the DC link 312. The leakage detector 348 detects any current leakage to ground from either of the first and second rails of the DC link 312. Further, in one embodiment, a first voltage indicator 350 may be connected between resistors 352 across the first and second rails of the DC link 312. The first voltage indicator 350 may be disposed between the rectifier 206 and the retarder arrangement 213 such that a high voltage condition may be detected. In a similar fashion, a second voltage indicator 354 may be connected between resistors 356 across the first and second rails of the DC link 312. The second voltage indicator 354 may be disposed between connection nodes 353 that connect to the motors 210 and the inverter circuit 208 to detect a voltage condition occurring during, for example, a bus bar fracture where the DC link 312 is not continuous, in order to diagnose whether the inverter circuit 208 is operating.

Figure 5:
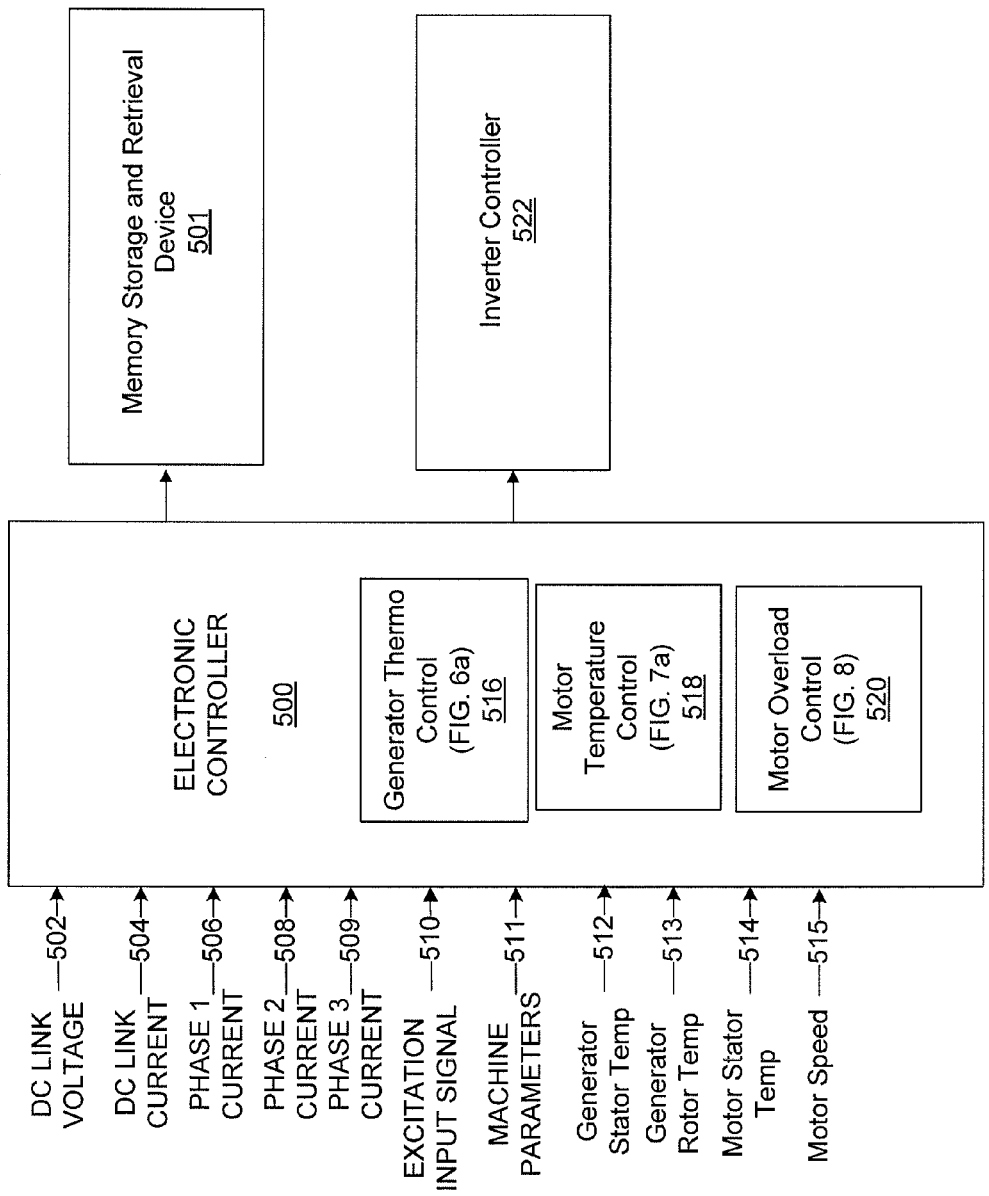
FIG. 5 is a block diagram illustrating various signal connections between a controller and components of an electric drive system in accordance with the disclosure.

A schematic block diagram for an electronic controller 500 for use in the drive system of an electric drive machine is shown in FIG. 5. The functionality of the electronic controller 500 is described herein both in general as well as specifically with regard to implementing control of electrical systems of the machine 100 to implement a deration strategy incorporating both the generator 204 and motors 210. The electronic controller 500 may be a single controller or may include more than one controller disposed to control various functions and/or features of a machine. For example, a master controller, used to control the overall operation and function of the machine, may be cooperatively implemented with a motor or engine controller, used to control the engine 202. In this embodiment, the term "controller" is meant to include one, two, or more controllers that may be associated with the machine 100 and that may cooperate in controlling various functions and operations of the machine 100 (FIGS. 1A and 1B). The functionality of the controller, while shown conceptually in FIG. 5 to include various discrete functions and signal interfaces for illustrative purposes only, may be implemented in hardware and/or software without regard to the discrete functionality shown. Accordingly, various interfaces of the controller are described relative to components of the drive system shown in the block diagrams of FIGS. 3 and 4. Such interfaces are not intended to limit the type and number of components that are connected, nor the number of controllers that are described.

The electronic controller 500 may operate in a logical fashion to perform operations, execute control algorithms, store and retrieve data, and so forth. In this embodiment, the electronic controller 500 may access a memory storage and retrieval device 501 that contains, for example, one or more tables (or other appropriate data organization) containing addressable elements of data. The memory storage and retrieval device 501 may be in the form of read only memory (ROM) or random access memory (RAM) or integrated circuitry that is accessible by the electronic controller 500, or integrated therewith.

In FIG. 5, the electronic controller 500 is configured to receive a voltage signal provided at a DC link voltage input 502 that is indicative of an instantaneous DC voltage present at the DC link 312 (FIGS. 3 and 4). The voltage transducer 314, for example, measures this value. In a similar fashion, the electronic controller 500 is configured to receive a current signal provided at a DC link current input 504, which is indicative of the current passing through the DC link 312 (FIG. 3). The current transducer 316 (see FIG. 3), for example, measures this value. Additionally, the electronic controller 500 is disposed to receive three phase current signals provided, one each, at a first phase current input 506, a second phase current input 508, and a third phase current input 509, respectively. The current transducers 306, for example, may each measure these values. Based upon the values of the signals for the first phase current input 506, the second phase current input 508 and the third phase current input 509, the electronic controller 500 can discern the magnitudes of the currents passing through each of the three outputs 301 of the generator 204 (FIG. 4). In addition, the electronic controller 500 may be capable of discerning the waveform shape. For example, each of the waveforms may be expected to have a sinusoidal waveform in each of the current signals. Based on such data, the electronic controller 500 may determine the instantaneous phase of each of the three phase currents during operation of the generator 204.

The electronic controller 500 may further receive information concerning the operation of the electric drive system of the machine 100. For example, in the embodiment of FIG. 4, the generator 204 operates under the control of an excitation signal applied to the excitation winding 303. The electronic controller 500 may monitor the excitation signal applied to the excitation winding 303 at an excitation input 510.

The electronic controller 500 may also receive information indicative of engine operating parameters. Such engine parameters may include engine speed, engine load, torque output, the presence of engine faults, or other parameters that concern a current operating state of the engine 202. Such engine parameters may be available for the electronic controller 500 at a machine parameters input 511.

Yet other input signals relate to the heating state of the generator 204 and the motors 210 and are processed by the electronic controller 500 in accordance with various deration strategies described herein. A stator temperature signal 512 provides a sensor value indicative of a current temperature of a stator in the generator 204. A rotor temperature signal 513 provides a value indicative of a current temperature of a rotor in the generator 204. A motor stator temperature signal 514 provides a value indicative of a current stator temperature for one or more of the motors 210. The temperatures of the generator 204 stator and/or rotor and the motors 210 stator can be either directly measured values (using resistance temperature detectors—RTDs) or (thermo) modeled values. A motor speed signal 515 is provided by each of the motors 210 that are subject to the deration strategies carried out by the electronic controller to prevent breakdown of the motors 210 due to prolonged operation in an over-temperature and/or overload state.

The electronic controller 500 may be configured to include a set of control blocks that execute deration strategies based upon the actual and/or modeled operational state of the generator 204 and motors 210. A generator thermo control 516 carries out a generator deration strategy (see FIG. 6) to ensure the generator 204 does not operate for a prolonged period of time in an excessive heating environment. A motor temperature control 518 carries out a motor deration strategy (see FIG. 7a) to ensure that the motors 210 do not operate for a prolonged period of time under excessively high temperatures. A motor overload control 520 carries out a motor deration strategy (see FIG. 8) to ensure that the motors 210 do not operate for a prolonged period of time under excessive thermal loading (either as a result of high motor torque or high motor speed operation). The electronic controller 500 determines a lowest required power or torque limit based upon the output from generator thermo control 516, the motor temperature control 518 and the motor overload control 520. The resulting power and/or torque limit is thereafter used to place an upper limit upon a torque command issued to an inverter controller 522 that provides the actual phase currents to the motors 210.

Moreover, the generator thermo control 516 and the motor temperature control 518 may be configured to utilize a temperature history to select a particular one of multiple deration schedules (relating a current temperature index value to a deration level/percentage). By way of example, a previous temperature value (actual or index) is compared to a current temperature value to determine a temperature trend (e.g., increasing, decreasing, and unchanged). The temperature trend is thereafter used to select one of at least two deration schedules—a first schedule for an upwardly trending temperature and a second schedule for a downwardly trending temperature. A second approach utilizes temperature states (e.g., Normal, Level 2, Level 3), indicating various levels of criticality for temperature, to select a particular one of multiple deration schedules as well as a next temperature state. There are multiple ways to incorporate such temperature/state history into deration determinations. For example, in yet other examples the rate of temperature change is observed to determine select a particular deration schedule. However, in general, utilization of temperature history/trend involves selecting a deration schedule that derates operation of a generator/motor relatively aggressively when temperature is trending higher and/or when a higher level state of overheating is entered, and conservatively raising power/torque limits as the temperature decreases while at/in an overheated level/state to ensure a timely exit from an overheating condition. More specifically, the power/torque target limit is raised more slowly than the rate at which the target limit was lowered (when derating was initiated and/or increased). Such asymmetric deration/recovery of torque/power limit may potentially avoid cycling between a derated state and normal state, or between two distinct levels of deration. As such, the deration schemes described herein below with reference to FIGS. 6, 7 and 8, for both the generator 204 and the motors 210, not only take into consideration a current temperature, but also the temperature change direction (rising/falling), or temperature state, when determining a target value. The asymmetric approach is characterized by a greater degree of deration for a given temperature index value when a component is recovering from an overheated state (or the temperature is decreasing while still over the defined threshold for derating)—in comparison to when the temperature index trend/history indicates an upward temperature trend. The asymmetric approach, for both generator and motor deration, contemplates exiting from a derated state at a lower temperature value than a temperature at which the derated state was entered.

Figure 6A:
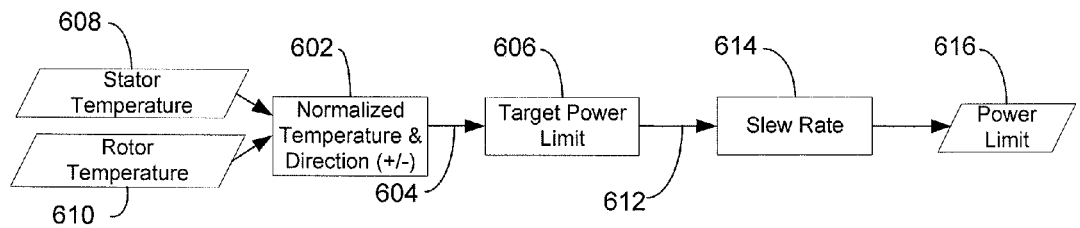
FIG. 6a is a process flow diagram depicting a series of process functional blocks and related signals for generator deration in response to temperature and/or thermal model.

A process flow diagram provided in FIG. 6a summarizes a series of process functional blocks and related signal values incorporated within the generator thermo control 516 to facilitate carrying out generator deration in response to detecting various levels of over limit temperatures in the generator 204. The generator deration strategy involves reducing a generator power limit, from a normal maximum, in response to detected over-temperature levels in the generator 204 components. The reduced (derated) generator power limit is converted into a corresponding torque command limit that governs a torque command issued to an inverter controller for the inverter circuit 208 providing A/C power to the motors 210 of the machine 100. In accordance with illustrative examples provided herein, the generator 204 operates under a derated mode (e.g., a lowered power output limit) in response to an over temperature event or overload event. A new target power limit is calculated according to a designated deration schedule, and the actual power output of the generator 204 to the inverter circuit 208 is gradually reduced according to the currently specified target power limit and a specified slew rate. The deration scheme for the generator 204 described herein is intended to avoid, or at least limit, occurrence of prolonged operation of the generator 204 at temperature and/or load conditions that are likely to damage electrical components (e.g., rotor windings, stator windings, etc.) within the generator 204. Moreover, the deration scheme for the generator 204 reduces instances involving forced shutdown of the generator 204 by taking remedial action (i.e., derating generator power output limit) immediately upon detection of over temperature and overload events.

Referring to the illustrative signal flow for generator deration depicted in FIG. 6a, a temperature normalization block 602 provides a composite temperature index value 604, potentially indicating an over temperature event, to a power limit block 606. The composite temperature index value 604 includes both a numerical value representing the current temperature state and a temperature direction indicating whether the temperature index (or alternatively the raw temperature itself) is increasing/unchanged/decreasing. The illustrative process flow includes at least two temperature sources: (1) a stator temperature 608 and (2) a rotor temperature 610. Other temperature sources, such as generator rotor bearing temperature sensors, are contemplated that can trigger generator deration in accordance with the signal flow generally summarized in FIG. 6a.

By way of example, the temperature normalization block 602 translates raw temperature values for the stator temperature 608 and the rotor temperature 610 into the composite temperature index value 604. The temperature normalization block 602 also generates a "normalized temperature direction" (increasing/unchanged/decreasing) based upon a comparison between a current normalized temperature value and a previous normalized temperature value. In an illustrative example, the composite temperature index value 604 ranges from zero (0) to ten (10) in suitable increments (granularity) for providing a suitable quantity/variation of pre-defined responses by the power limit block 606 when calculating a current target power limit. By way of example, the temperature normalization block 602 renders a temperature index value in increments of one (1). Such granularity facilitates processing up to eleven (11) distinct current temperature index states—a suitable level of granularity for carrying out the illustrative generator deration scheme. Moreover, the composite temperature index value 604 is taken as the larger of the converted index values for the stator temperature 608 and the rotor temperature 610. Alternatively, the composite temperature index value 604 is a weighted combination of the stator temperature 608 and the rotor temperature 610. In yet other embodiments, a weighted combination is used unless one of the stator temperature 608 and the rotor temperature 610 is substantially higher and indicates severe heating.

The power limit block 606 executes logic, based upon the composite temperature index value 604 (and temperature direction/state discussed above), to render a target power value 612 ranging from 100 (no deration) to 60 percent (maximum deration). In an exemplary embodiment, the power limit block 606 executes a proportional control having a variable gain (i.e., a change in deration per unit change in temperature). Moreover, the power limit block 606 may incorporate a step-wise (as opposed to continuous) approach to designating a deration value for a provided instance of the composite temperature index value 604. Thus, the generator is derated to a constant value over a given range of temperature index values beginning at a deration temperature index threshold (e.g., 7). Such stepwise control is implemented in any one of a variety of ways including, for example, (1) limiting the values for the temperature index component of the composite temperature index value 604, and (2) rounding the temperature index component of the composite temperature index value 604.

Conceptually, the power limit block generates a control error, representative of a difference between a current composite temperature index value 604 and deration threshold, when the composite temperature index value 604 exceeds the temperature index-based generator deration threshold (e.g., a temperature index value of 7 for a rising temperature for a previously non-derated system). Conceptually, a gain (Kx) is applied to the control error to render the target power value 612. As noted above, the gain is based at least in part upon the temperature state/direction of the composite temperature index value 604. By way of example, the deration percentage is specified by a multi-variable mapping function. A first input to the multi-variable mapping function is the control error itself (or a range starting point and control error within the range). A second input to the multi-variable mapping function is the temperature direction (or more generally a temperature history value) of the composite temperature index value 604. Moreover, the magnitude of the gain Kx is generally greater for increasing temperature index values (in comparison to a downwardly trending temperature)—intended to ensure a fast response to rising temperature index values and avoid reentry into an increased overheating state once the temperature begins to fall. Thus, the values of the multi-variable mapping function are specified to ensure relatively large (deration percentage) response by the system to rising operating temperatures in the generator in comparison to falling temperatures while the generator is operating under conditions requiring deration. This generalization of deration schemes, including asymmetric gains for increasing/decreasing temperatures, may be applied to motor deration schemes that are described herein below.

Figure 6B:
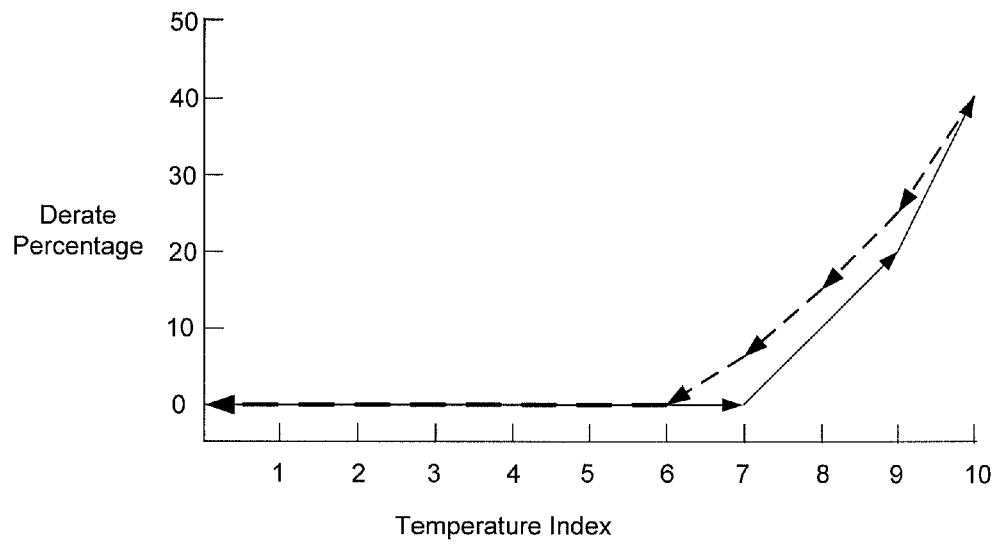
FIG. 6b is a graphical representation of an exemplary relationship between generator temperature index and generator deration percentage.

The temperature direction aspect of the composite temperature index value 604 is also taken into consideration when determining whether deration is needed. In an illustrative example, a temperature index between 0 and 7 (in a range of 0 to 10) is considered Normal when the previous generator temperature state is Normal (i.e., not derated). However, once a derating mode is entered (i.e., where a current power limit includes at least some derating), derating the generator 204 power is maintained until the temperature value of the temperature index value 604 falls to 6. This hysteresis, in combination with differing relative gains based upon temperature direction of the composite temperature index value 604, is intended to reduce cycling between normal and derated power limit states. The goal of the generator deration strategy implemented herein is to utilize a maximum available power while restoring an overheated generator to a normal temperature range. FIG. 6b summarizes an illustrative example of multivariable mapping of the composite temperature index value 604 to the target power value 612 rendered by the power limit block 606. The slope of the line segments corresponds to the aforementioned gain Kx—a value that increases as the temperature level becomes more critical (i.e., in the temperature index range of 9-10). The arrowhead on the head of each segment depicted in FIG. 6b indicates the temperature direction component of the composite temperature index value 604 provided to the multi-variable mapping function from which a deration percentage is obtained. Thus, with continued reference to FIG. 6b, as temperature index values increase from 1 to 7, the deration percentage stays at a value of zero. However, for a temperature index range of 7-9, deration increases linearly from zero to 20 percent. Thereafter, as temperature increases from 9 to 10, the deration percentage increases linearly from 20 to 40 percent. However, as the temperature index value decreases, the target deration values, in general, remain relatively higher than deration values provided when the temperature index is increasing. There are numerous alternative ways to carry out asymmetric derating based upon temperature direction. However, a common characteristic for the mapping schemes is that deration is greater, for a given temperature index value, while a temperature index is decreasing (i.e., during temperature recovery) than when the temperature index is increasing.

A slew rate limit block 614 applies a rate-of-change limit to the target power value 612 to render a real-time power limit value 616. The power limit value 616 rendered by applying the slew rate limit block to the target power value 612 in the generator thermo control 516 is thereafter converted to a torque limit by the electronic controller 500 (previously described herein above with reference to FIG. 5). The torque limit rendered as a result of the power limit value 616 is factored with other provided sources of torque limit values (see, FIGS. 7a and 8 described herein below) to render a final torque limit and torque command issued by the electronic controller 500 to the inverter controller 522.

Long-term uninterrupted operation of the machine 100, under high load and/or speed conditions, is further ensured by a motor deration strategy that addresses motor over-temperature and overload event conditions. The motor over-temperature condition is sensed directly by a temperature sensor, and the overload event condition is identified by sensing overload conditions on the motor for an extended period of time. The motor deration scheme for over-temperature conditions is summarized by the signal flow diagram depicted in FIG. 7a, and the motor deration scheme for overload conditions (or a period of time) is summarized in FIG. 8.

Figure 7A:
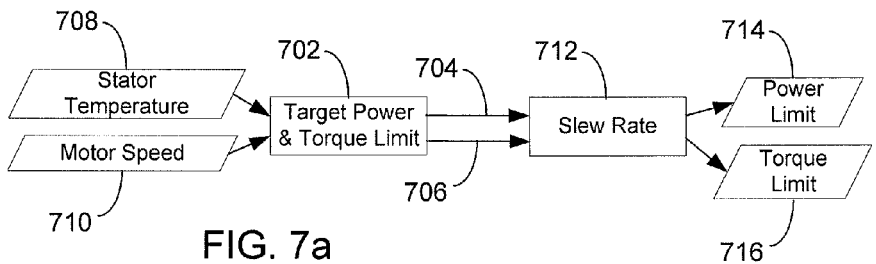
FIG. 7a is a process flow diagram depicting a series of process functional blocks and related signals for motor deration in response to over-temperature stator events (as indicated by either a temperature sensor or thermal model)

Turning to FIG. 7a, a signal flow diagram summarizes operation of an illustrative motor deration strategy for stator thermal over-temperature events. However, the deration strategy is expanded, in alternative embodiments to address bearing thermal over-temperature events. With specific reference to FIG. 7a, a power and torque limit block 702 generates a target power limit 704 and a target torque limit 706 based upon a received stator temperature value 708 and a motor speed value 710.

The strategy for controlling motor operation in response to stator thermal over-temperature events is similar to the generator deration strategy in that multiple deration schedules are provided based upon the temperature direction/state (as described above with reference to generator derating). However, the motor deration strategy differs from the generator deration strategy in that a deration schedule is additionally selected based upon the operating speed of the motor. In general either, or both, a power limit and a torque limit are conditionally generated based upon the operating speed of the motor. More particularly, torque is limited at low motor speeds (e.g., less than 600 RPM), and power is limited at high motor speeds (e.g., over 1000 RPM). In the case of a power limit being specified (i.e., at high motor speeds), the derated power limit is subsequently converted to a torque limit which is then used by the electronic controller 500 when generating a torque command to the inverter controller 522. By limiting the torque command to the inverter controller 522, the heat to the motor is limited by preventing motor operation in low speed/high torque (high loss) and high speed/high power operating regions. In a middle motor speed range (e.g., 600 to 1000 RPM) no deration is imposed. Thus, full performance is allowed at and slightly below continuous torque (i.e., without deration). By allowing full operation at a near continuous torque, the motor can continue performing a necessary function. Using full power, the machine will spend the least amount of time in a thermally challenging state. An example of the above-described deration scheme for motor deration is provided in Table 1.

Table 1, provided herein below, summarizes logic incorporated into the power and torque limit block 702 for selectively derating either the target power limit 704 or the target torque limit 706 provided to a slew rate block 712. The target power and torque limits are enforced in accordance with an over-temperature event, propel/retard mode indication, current temperature index value (of the motor's stator) and current motor speed. In the exemplary deration scheme summarized in Table 1, the deration value determination logic is divided, for purposes of selecting a particular deration approach, into: three temperature states, two motor operation modes (propel/retard), and three motor speed ranges.

TABLE 1

Over-temperature Motor Deration

| Over-temperature Status | Propel/ Retard mode | Motor speed (RPM) | Power limit | Torque limit |
| --- | --- | --- | --- | --- |
| Normal | Both | All | n/a | n/a |
| Level 2 | Propel | <=600 | — | Trq1 |
| Level 2 | Propel | >600 <=1000 | n/a | n/a |
| Level 2 | Propel | >1000 | $P_{rated\_p} - K1(T_{stator} - T_{stator\_L2})$ | |
| Level 2 | Retarding | <=600 | — | $Trq2 - K2(T_{stator} - T_{stator\_L2})$ |
| Level 2 | Retarding | >600 <=1000 | n/a | n/a |
| Level 2 | Retarding | >1000 | $P_{rated\_r} - K3(T_{stator} - T_{stator\_L2})$ | — |
| Level 3 | Propel | <=610 | — | $Trq1 - K4(T_{stator} - T_{stator\_L2})$ |
| Level 3 | Propel | >600 <=1000 | n/a | n/a |
| Level 3 | Propel | >1000 | $P_{rated\_p} - K5(T_{stator} - T_{stator\_L2})$ | — |
| Level 3 | Retarding | <=1000 | — | $Trq2 - K6(T_{stator} - T_{stator\_L2})$ |
| Level 3 | Retarding | >600 <=1000 | n/a | n/a |
| Level 3 | Retarding | >1000 | $P_{rated\_r} - K7(T_{stator} - T_{stator\_L2})$ | — |

Referring to Table 1, the first column identifies an over-temperature state (as opposed to a temperature index value). The temperature states generally follow ones previously discussed above with reference to FIG. 6b. The Normal state corresponds to a temperature index value range of 0-7 (when a previous level was Normal) and 0-6 (when a previous level was Level 2 and the temperature index is falling). The motor temperature-based derating scheme thus incorporates hysteresis. Level 2 corresponds to a 7-9 temperature index range (when temperature is rising) and 6-9 (when a previous level was Level 2 and the temperature index is falling). Level 3 corresponds to temperature index values from 9-10. Thus, once a motor enters the Level 2 temperature state, it must drop several degrees (e.g., 10 degrees Celsius) below the Level 2 threshold temperature (corresponding to the temperature index value of 7) before returning to the Normal state.

Importantly, when an over-temperature event state exists, selection of either the target power limit or the target torque limit for purposes of derating the motor is based upon the current motor speed. By way of example, if the motor speed value 710 indicates a current motor speed at/below 600 RPM then a target torque limit 706 is issued to a slew rate block 712. When the motor operates at relatively low RPM, losses are primarily associated with operation of the motor in a high torque region. By limiting torque, heating arising from high currents flowing during low speed operation of the motor is limited. On the other hand, if the motor speed is above 1000 RPM (relatively high), then a target power limit 704 is issued to the slew rate block 712. When the motor operates at relatively high RPM, losses are primarily associated with eddy currents in the motor core arising from high speed field switching. Limiting power, by limiting the motor speed, reduces switching losses and heating arising from eddy currents generated by high speed switching of the motor windings. It is further noted that power and torque are limited even during retarding since failure to manage heating during retard operation of a motor can be just as destructive as propel mode heating.

In the example summarized in Table 1, if the temperature state is Normal, then no derating occurs. Moreover, as explained previously herein above, no motor derating occurs regardless of the temperature state (or motor operation mode) while the motor speed is within a mid range (e.g., 600 to 1000 RPM). However, deration is implemented for low and high motor speeds when a threshold temperature is reached. Moreover, the choice of deration approach varies between full torque and rated power based upon speed of the overheating motor.

More specifically, and with reference to Table 1, when the motor is propelling the machine in a low speed mode (e.g., less than 600 RPM) and the motor temperature reaches an over-temperature threshold (i.e., temperature index reaches 7 in a range of 0 to 10), a Level 2 temperature state is entered, and the motor operation is derated in accordance with a constant torque limit (Trq1) regardless of the specific temperature index value within the Level 2 temperature range. An example for the value of Trq1 is 75 percent of maximum torque. In contrast, when the motor is propelling the machine in a high speed mode (e.g., greater than 1000 RPM) and the motor temperature reaches the Level 2 state, then motor power (as opposed to torque—which is already low) is derated linearly from full power down to 75 percent of full power at the high end of the Level 2 temperature range (e.g. temperature index is 9) in accordance with a gain K1.

Figure 7B:
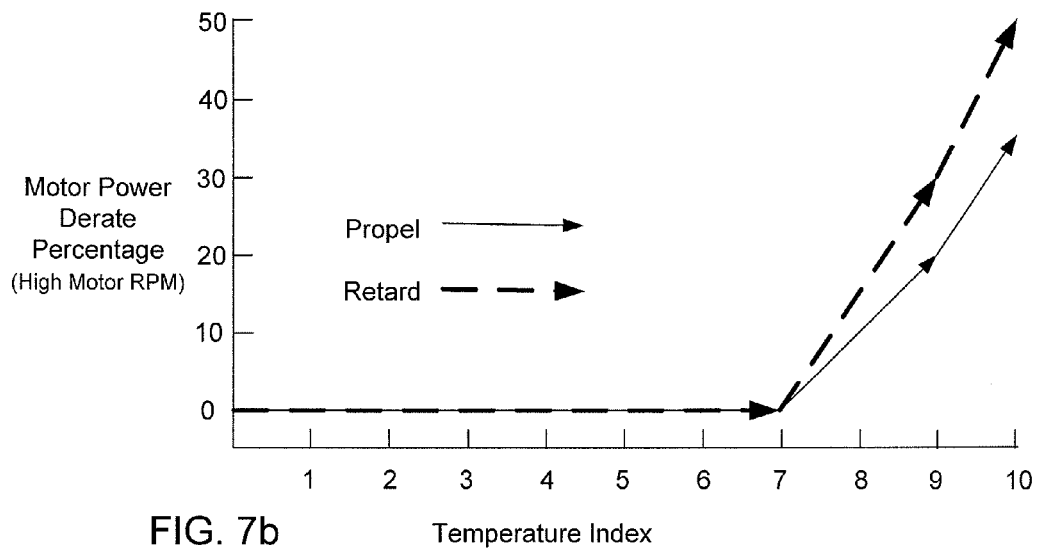
FIG. 7b is a graphical representation of an exemplary relationship between temperature index and motor power deration percentage when a motor is operating in a high RPM state.
Figure 7C:
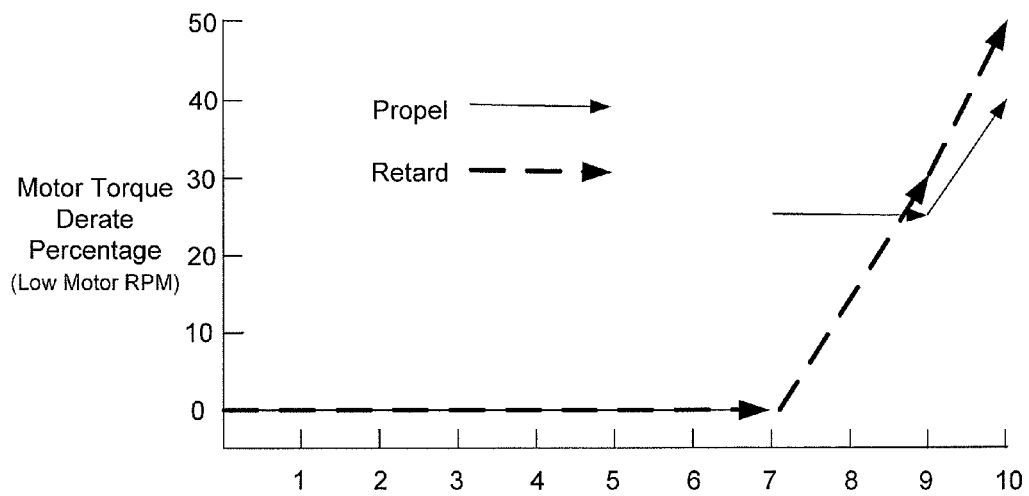
FIG. 7c is a graphical representation of an exemplary relationship between temperature index and motor torque deration percentage when a motor is operating in a low RPM state.

The expressions contained in the Power Limit and Torque Limit columns of Table 1 represent the rate at which the torque (for low speeds) and power (for high speeds) is derated as temperature increases. In the particular example set forth in Table 1, $P_{rated\_p}$, $P_{rated\_r}$ are rated power for the motor in propel mode and retarding mode (respectively); Trq1 and Trq2 are rated torque in the propel mode and retarding mode (respectively); K1, K3, K5 and K7 are the power ramp down rates with respect to temperature; and K2, K4 and K6 are torque ramp down rates with respect to temperature. Alternatively, the expressions can be provided in terms of a temperature index such as the one (ranging from zero to 10) described herein above with reference to generator deration. FIGS. 7b and 7c depict illustrative deration schedules for power and torque, respectively, in accordance with high and low speed deration schedules applied by the power and torque limit block 702. The solid lines correspond to propel mode and dashed lines correspond to retard mode. It is generally noted that deration can be greater when in retard mode since the machine operator can use mechanical brakes to compensate for the reduced motor breaking due to deration. Furthermore, the duration (i.e., the amount of time) for operating the generator/motor in a derated state may be limited by a specified maximum value (or alternatively a percentage of operation time) deration Finally, is it noted that motor deration may also be implemented asymmetrically, based upon whether the temperature of the motor is rising or falling, in a manner similar to the one discussed above with reference to generator deration, in order to lessen the likelihood of the motor temperature fluctuating excessively.

While the illustrative embodiment is described with reference to a single motor, in many applications, multiple motors operate to propel the machine 100. In such cases, each motor is separately managed and only the affected motor is derated (i.e., power/torque limited). Any motor having a measured temperature exceeding the over-temperature threshold is derated by limiting either the power or torque for the single motor. Other motors are still able to produce full torque or full power as long as the over-temperature has not been reached.

Figure 8:
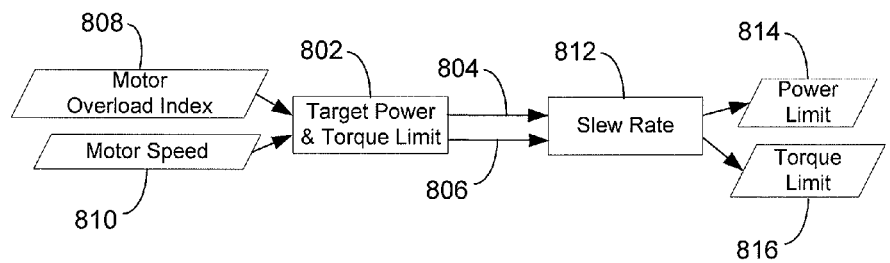
FIG. 8 is a process flow diagram depicting a series of process functional blocks and related signals for motor deration in response to a motor thermal overload event.

Turning to FIG. 8, motor thermal overload is associated with motor thermal operational limits being exceeded for a period of time (causing build up of heat and preventing cooling of the motor). Motor thermal overload occurs, for example, when motor phase current is larger than rated continuous phase current for a short term. The short term region for motor operation is the low motor speed and high motor torque portion of the motor torque versus speed curve. In this operating region, encountered for example when climbing a steep grade with a heavy load, phase current through the motor is larger than the rated phase current under continuous operation condition. In this high torque low speed operational mode, a primary driver of losses in the motor is high current. High currents produce large losses in drive train components, which in turn cause the components to heat up very rapidly. Temperature sensors on motor components are potentially too slow to respond to avoid damage to the motor due to overheating.

Thus, to protect the motor from load and overheating damage associated with the high currents, a motor overload strategy is carried out by the motor overload control 520 in accordance with the signal flow diagram depicted in FIG. 8. A thermal overload event is tripped, causing the target power and torque limit block 802 to issue a target power limit 804 or a target torque limit 806 based on a motor overload index 808 calculated from a phase current magnitude and length of time at that magnitude. The specific parameter values used to configure the target power and torque limit block 802 (and a trigger to invoking such limiting functionality) varies according to motor design. However, the motor thermal overload event should be sufficiently tuned issue a warning and derate operation of the motor before damage to motor components occurs.

With continued reference to FIG. 8, the exemplary flow diagram for an exemplary deration strategy for motor thermal overload events includes the target power and torque limit block 802 that calculates the target power limit 804 and the target torque limit 806 based upon the above described motor overload index (MOI) 808 and a motor speed 810. A slew rate limit block 812 smoothes the received target power limit 804 and target torque limit 806 to provide a power limit 814 and a torque limit 816 analogously to the production of the corresponding output signals described herein above for the motor stator over-temperature deration strategy described with reference to FIG. 7a.

In the illustrative example, the motor overload control 520 only trips a Level 2 event (initial overheating) and does not trigger a Level 3 event (immediate shutdown required). The motor thermal overload deration strategy includes, in the target power and torque limit block 802, computational logic for generating the target power limit 804 and target torque limit 806 in accordance with the MOI 808 and motor speed 810.

After a motor thermal overload event, the target torque limit 806 ($Trq_{limit}$) and the target power limit 804 ($P_{limit}$) are set in the following three ways:

1. No limitation is set for motor torque and power if the MOI is less than MOI_lower (i.e., not motor thermal overload)
2. $Trq_{limit}$ is the maximum torque under continuous operation region if the MOI is larger than MOI_upper,
3. Otherwise, $Trq_{limit}$ is equal to $Trq_0 + m_0$ (MOI_upper–MOI); $P_{limit}$ is equal to $P_0 + m_1$ (MOI_upper–MOI)

where $Trq_{limit}$ and $P_{limit}$ is upper torque limit and power limit, $Trq_0$ and $P_0$ is the nominal torque and power at given motor speed, MOI is motor thermal overload index, $m_0$ and $m_1$ are motor torque and power ramp rates, and MOI_upper and MOI_lower are the upper and lower limits of motor overload index.

Thus, the motor operates in a derated state after either a stator over-temperature event or motor thermal overload event. The motor is derated in response to such events (entering the Level 2 mode) to limit occurrences of Level 3 over-temperature events, while minimizing the impact to machine performance and particularly minimizing forced shutdowns at reasonable effective grades (either climbing or descending).

Figure 9:
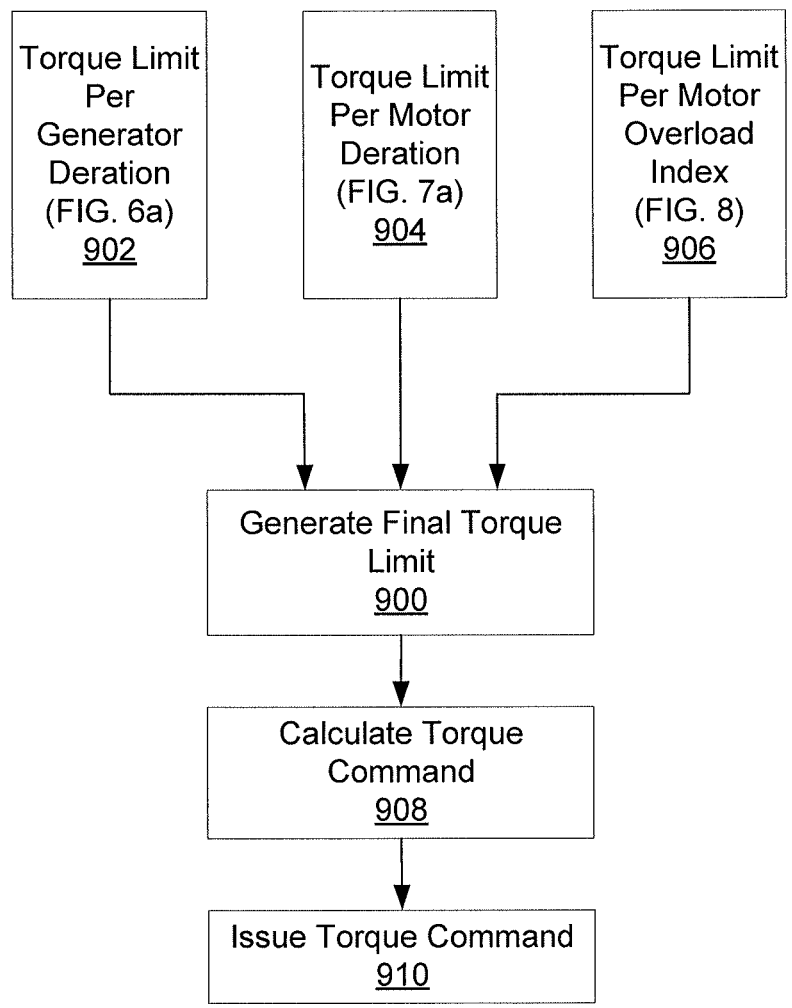
FIG. 9 is a flow diagram summarizing the operation of an electronic controller to render a torque limit based upon multiple calculated torque limits.

Turning briefly to FIG. 9, the following summarizes operation of the electronic controller 500 to calculate a final torque limit during 900, in response to receiving torque limit values 902, 904, and 906 issued by the generator thermo control 516, motor temperature control 518 and the motor overload control 520, respectively, based upon a variety of sensed/rendered parameter values including: the current temperature state (Normal, Level 2 or Level 3), the generator stator temperature, the generator rotor temperature, the motor stator temperature(s), the motor overload index (MOI), and the motor speed(s). The electronic controller 500 uses the sensed/rendered values to determine an actual or modeled overheated state for the generator 204 or motors 210 and to derate operation of the motor(s) to alleviate overheating in either the generator or the motors by reducing limits on power consumed/generated and torque generated by the motors 210. Thus, during 900 the electronic controller 500 generates a final torque limit from the three torque limit values rendered during 902, 904 and 906 by the process flows summarized in FIGS. 6a, 7a and 8. The electronic controller, at 908 compares a current torque request by the machine operator to the final torque limit rendered at 900 to determine a potentially limited torque command—if the operator torque command exceeds the final torque limit. Thereafter the electronic controller 500 issues a torque command to the inverter controller 522 at 910 based upon the final torque limit—i.e., the smaller value of the current torque request by the machine operator and the final torque limit rendered by the electronic controller 500 during 900.

INDUSTRIAL APPLICABILITY

The industrial applicability of the methods and systems for derating either one or both the generator and motors of a machine as described herein should be readily appreciated from the foregoing discussion. The present disclosure may be included as part of an overall diagnostic scheme that monitors the operating condition of various electrical power generator and electrical drive motor circuit components in an electric motor drive system. That is, the diagnostic flags and/or alerts that are provided as a result of detecting a over-temperature or motor overload events may include the storage of diagnostic codes in memory that are later read out. Such diagnostic codes may take many different forms. For example, other operating data concerning the equipment and the time of the creation of the code or codes may also be stored and available for diagnosis.

The disclosure, therefore, is applicable to many machines and many environments. One exemplary machine suited to the disclosure is an off-highway truck. Exemplary off-highway trucks are commonly used in mines, construction sites, and quarries. Entities that use these off-highway trucks often sustain significant monetary losses for unscheduled times that an off-highway truck is inoperable or is not operating at peak efficiency, as other operations may also be placed behind schedule.

Off-highway trucks, particularly those adapted to use electric, hybrid, or direct series electric drive systems, may require time-consuming processes to determine and repair a malfunctioning electrical power generator or motor in an electrical power generator and drive motor system. Thus, a method and system that enable such system to operate in a lesser capacity to prevent work stoppage without further damaging the drive system can reduce the amount of time that an off-highway truck is inoperable and save significant expenditures.

Further, the methods and systems described above can be adapted to a large variety of machines and tasks. For example, other types of industrial machines, such as backhoe loaders, compactors, feller bunchers, forest machines, industrial loaders, skid steer loaders, wheel loaders and many other machines can benefit from the methods and systems described.

It will be appreciated that the foregoing description provides examples of the disclosed system and technique. However, it is contemplated that other implementations of the disclosure may differ in detail from the foregoing examples. All references to the disclosure or examples thereof are intended to reference the particular example being discussed at that point and are not intended to imply any limitation as to the scope of the disclosure more generally. All language of distinction and disparagement with respect to certain features is intended to indicate a lack of preference for those features, but not to exclude such from the scope of the disclosure entirely unless otherwise indicated.

Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context.

Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

What is claimed is:

1. A machine propelled by an electric motor, the machine comprising:
   a drive wheel connected to a rotating interface of the electric motor for operating at least in a propel mode wherein the electric motor delivers rotational force to the drive wheel;
   an electronic controller configured with computer executable instructions for performing the steps of:
   receiving a temperature signal indicative of a current temperature status of the electric motor;
   receiving a motor speed signal indicative of a current speed status of the electric motor;
   calculating, in accordance with a derating scheme, a deration value for the electric motor, the deration value being determined by applying values of a set of current operating state parameters to the derating scheme, the set of current operating state parameters comprising:
      a motor speed parameter having a value derived from the motor speed signal; and
      a temperature parameter having a value derived from temperature signal
   wherein, during the calculating step, the deration value specifies a torque limit for the electric motor when the current speed status corresponds to a low motor speed range,
   wherein, during the calculating step, the deration value specifies a power limit for the electric motor when the current speed status corresponds to a high motor speed range, and
   wherein, during the calculating step, the deration value is a constant, non-zero, value over a specified range for the temperature parameter value.

2. The machine of claim 1 wherein the electronic controller is configured to convert the power limit to a torque limit.

3. The machine of claim 1 wherein, during the calculating step, the deration value is a constant value over a specified range for the motor speed parameter value.

4. The machine of claim 3 wherein the specified range for the motor speed parameter value constitutes a middle motor speed range.

5. The machine of claim 4 wherein the constant value, when the motor speed parameter value corresponds to the middle motor speed range, specifies a zero level of derating the electric motor.

6. The machine of claim 1 wherein the set of current operating state parameters comprises a temperature direction parameter value indicating whether the temperature value is lowering.

7. The machine of claim 6 wherein the deration scheme specifies:
   relatively smaller deration values when the temperature direction parameter indicates an increasing temperature trend, and
   relatively larger deration values when the temperature direction parameter indicates a decreasing temperature trend.

8. The machine of claim 1 wherein the set of current operating state parameters comprises a motor mode parameter value indicating whether the motor is operating in a propel or retard mode.

9. The machine of claim 1 wherein the electronic controller includes a motor temperature control that enters a motor overheating state at a higher temperature than a temperature at which the motor temperature control leaves the motor overheating state.

10. The machine of claim 1 wherein the machine further comprises:
    a temperature sensor positioned proximate the electric motor, the temperature sensor being configured to sense a temperature of a motor component susceptible to overheating, and wherein the temperature sensor provides a signal corresponding to the temperature signal indicative of a current temperature status of the electric motor.

11. The machine of claim 1 wherein the temperature signal is rendered from a thermo model.

12. The machine of claim 1 wherein during the calculating, for a particular value of the temperature parameter, a particular deration schedule is selected based upon a current value of the motor speed parameter.

13. A machine propelled by an electric motor, the machine comprising:
    a drive wheel connected to a rotating interface of the electric motor for operating at least in a propel mode wherein the electric motor delivers rotational force to the drive wheel;
    an electronic controller configured with computer executable instructions for performing the steps of:
    receiving a temperature signal indicative of a current temperature status of the electric motor;
    receiving a motor speed signal indicative of a current speed status of the electric motor;
    calculating, in accordance with a derating scheme, a deration value for the electric motor, the deration value being determined by applying values of a set of current operating state parameters to the derating scheme, the set of current operating state parameters comprising:
       a motor speed parameter having a value derived from the motor speed signal, and
       a temperature parameter having a value derived from temperature signal,
       wherein, during the calculating step, a motor overload index-based deration value is further specified in accordance with a sensed phase current level over a period of time and a thermal model representative of the electric motor operating under high load conditions for an period of time.

14. A machine propelled by an electric motor, the machine comprising:
    a drive wheel connected to a rotating interface of the electric motor for operating at least in a propel mode wherein the electric motor delivers rotational force to the drive wheel;
    an electronic controller configured with computer executable instructions for performing the steps of:
    receiving a temperature signal indicative of a current temperature status of the electric motor;

receiving a motor speed signal indicative of a current speed status of the electric motor;

calculating, in accordance with a derating scheme, a deration value for the electric motor, the deration value being determined by applying values of a set of current operating state parameters to the derating scheme, the set of current operating state parameters comprising:

a motor speed parameter having a value derived from the motor speed signal, and a temperature parameter having a value derived from temperature signal; and a generator providing power for the electric motor, and wherein, during the calculating step, a generator temperature-based deration value is rendered based upon a generator temperature signal.

15. The machine of claim 14 wherein the electronic controller includes a generator thermo control that enters a generator overheating state at a higher temperature than a temperature at which the generator thermo control leaves the generator overheating state.

16. A machine propelled by an electric motor, the machine comprising:

a drive wheel connected to a rotating interface of the electric motor for operating at least in a propel mode wherein the electric motor delivers rotational force to the drive wheel;

an electronic controller configured with computer executable instructions for performing the steps of:

receiving a temperature signal indicative of a current temperature status of the electric motor;

receiving a motor speed signal indicative of a current speed status of the electric motor;

calculating, in accordance with a derating scheme, a deration value for the electric motor, the deration value being determined by applying values of a set of current operating state parameters to the derating scheme, the set of current operating state parameters comprising:

a motor speed parameter having a value derived from the motor speed signal, and a temperature parameter having a value derived from temperature signal, wherein a final torque limit value is calculated by the electronic controller by comparing torque limits rendered by a set of deration values generated by at least two controls from the set consisting of: a generator thermo control, a motor temperature control, and a motor overload index control.

17. A method carried out on a machine propelled by an electric motor, the machine further comprising a drive wheel connected to a rotating interface of the electric motor for operating at least in a propel mode wherein the electric motor delivers rotational force to the drive wheel and an electronic controller configured with computer executable instructions, wherein the method comprises the steps of:

receiving a temperature signal indicative of a current temperature status of the electric motor;

receiving a motor speed signal indicative of a current speed status of the electric motor;

calculating, in accordance with a derating scheme, a deration value for the electric motor, the deration value being determined by applying values of a set of current operating state parameters to the derating scheme, the set of current operating state parameters comprising:

a motor speed parameter having a value derived from the motor speed signal; and a temperature parameter having a value derived from temperature signal, wherein, during the calculating step, the deration value specifies a torque limit for the electric motor when the current speed status corresponds to a low motor speed range, wherein, during the calculating step, the deration value specifies a power limit for the electric motor when the current speed status corresponds to a high motor speed range, and wherein, during the calculating step, the deration value is a constant, non-zero, value over a specified range for the temperature parameter value.

18. The method of claim 17 wherein during the calculating, for a particular value of the temperature parameter, a particular deration schedule is selected based upon a current value of the motor speed parameter.

19. A non-transitory computer-readable medium including computer-executable instructions performed by an electronic controller on a machine propelled by an electric motor, the machine further comprising a drive wheel connected to a rotating interface of the electric motor for operating at least in a propel mode wherein the electric motor delivers rotational force to the drive wheel, and wherein the computer-executable instructions facilitate performing, by the electronic controller, the method comprising the steps of:

receiving a temperature signal indicative of a current temperature status of the electric motor;

receiving a motor speed signal indicative of a current speed status of the electric motor;

calculating, in accordance with a derating scheme, a deration value for the electric motor, the deration value being determined by applying values of a set of current operating state parameters to the derating scheme, the set of current operating state parameters comprising:

a motor speed parameter having a value derived from the motor speed signal; and a temperature parameter having a value derived from temperature signal, wherein, during the calculating step, the deration value specifies a torque limit for the electric motor when the current speed status corresponds to a low motor speed range, wherein, during the calculating step, the deration value specifies a power limit for the electric motor when the current speed status corresponds to a high motor speed range, and wherein, during the calculating step, the deration value is a constant, non-zero, value over a specified range for the temperature parameter value.

20. The non-transitory computer-readable medium of claim 19 wherein during the calculating, for a particular value of the temperature parameter, a particular deration schedule is selected based upon a current value of the motor speed parameter.

\* \* \* \* \*